(12) United States Patent
Wiley et al.

(10) Patent No.: US 8,031,626 B2
(45) Date of Patent: Oct. 4, 2011

(54) PACKET STRUCTURE FOR A MOBILE DISPLAY DIGITAL INTERFACE

(75) Inventors: George Alan Wiley, San Diego, CA (US); Brian W. Steele, Denver, CO (US); Shashank Shekhar, Bangalore (IN); Laura A. Randall, Portland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 12/269,233

(22) Filed: Nov. 12, 2008

(65) Prior Publication Data

US 2009/0187672 A1 Jul. 23, 2009

Related U.S. Application Data

(63) Continuation-in-part of application No. 12/116,018, filed on May 6, 2008.

(60) Provisional application No. 61/002,982, filed on Nov. 14, 2007, provisional application No. 61/004,374, filed on Nov. 27, 2007.

(51) Int. Cl.
*G06F 13/00* (2006.01)
(52) U.S. Cl. .................. 370/252; 370/392; 709/233
(58) Field of Classification Search ............... 370/252, 370/392; 709/230–233, 238
See application file for complete search history.

(56) References Cited

U.S. PATENT DOCUMENTS

| 5,410,308 | A | 4/1995 | Keesen et al. |
| 6,593,937 | B2 | 7/2003 | Ludtke et al. |
| 6,760,772 | B2 * | 7/2004 | Zou et al. ............ 709/230 |
| 7,286,536 | B2 | 10/2007 | Greis et al. |
| 7,315,265 | B2 | 1/2008 | Wiley et al. |
| 2005/0157758 | A1 | 7/2005 | Yoo |
| 2005/0216599 | A1 | 9/2005 | Anderson et al. |
| 2009/0109207 | A1 | 4/2009 | Nakamura et al. |
| 2010/0128626 | A1 * | 5/2010 | Anderson et al. ........ 370/252 |

FOREIGN PATENT DOCUMENTS

| EP | 383557 A1 | 8/1990 |
| EP | 402973 A1 | 12/1990 |
| EP | 579075 A2 | 1/1994 |
| JP | 06149522 | 5/1994 |
| WO | WO2004111596 A2 | 12/2004 |
| WO | 2005091593 A | 9/2005 |
| WO | WO2005091544 | 9/2005 |
| WO | WO2006075891 A1 | 7/2006 |
| WO | WO2006092764 A1 | 9/2006 |
| WO | WO2006112229 A1 | 10/2006 |

OTHER PUBLICATIONS

International Search Report, PCT/US2008/083419. International Searching Authority—European Patent Office. Mar. 2, 2009.

(Continued)

*Primary Examiner* — Luat Phung
(74) *Attorney, Agent, or Firm* — Nicholas J. Pauley (57) ABSTRACT

An Enhanced Reverse Link Encapsulation packet for a MDDI system combines and improves upon the functionality of the Round Trip Delay Measurement packet and Reverse Encapsulation packet. The combination of these packets allows for reduced MDDI link overhead when providing client reverse link transmission. This packet allows for dynamic reverse link bandwidth allocation and therefore improved MDDI link utilization.

30 Claims, 4 Drawing Sheets

OTHER PUBLICATIONS

Written Opinion of the International Searching Authority, PCT/US2008/083419. International Searching Authority—European Patent Office. Mar. 2, 2009.
30.1: Invited Pacer: Digital Packet Video Link—A VESA Procosed Standard, XP007008292.
Jun Hanari and Manabu Vvatanabe et al: "1 5.2: Development of an UXGA Display System by a Digital Packet Video Link." 2001 SID International Symposium—Jun. 3-8,2001, San Jose Convention Center, California. vol. XXXII, Jun. 30, 2001 (Jun. 3, 2001), p. 21 0, XP007007646.
Kwon H M: "Frame synchronization for a channel with different data rates" 19900930; 19900930-19901003, Sep. 30, 1990, pp. 176-180, XP010002768 abstract.

* cited by examiner

PACKET STRUCTURE FOR A MOBILE DISPLAY DIGITAL INTERFACE

CLAIM OF PRIORITY UNDER 35 U.S.C. §119

The present application for patent claims priority to Provisional Application No. 61/002,982 entitled "High Data Rate Interface Apparatus & Method" filed Nov. 13, 2007, and Provisional Application No. 61,004,374 entitled "High Data Rate Interface Apparatus & Method" filed Nov. 27, 2007, both applications are assigned to the assignee hereof and are hereby expressly incorporated herein by reference.

CLAIM OF PRIORITY UNDER 35 U.S.C. §120

The present application for patent is a Continuation-in-Part and claims priority to patent application Ser. No. 12/116,018 entitled "A Packet Structure for a Mobile Display Digital Interface" filed May 6, 2008, and is assigned to the assignee hereof and is hereby expressly incorporated herein by reference.

BACKGROUND

1. Field

The present invention relates generally to communication links and more particularly to a method, system, and computer program product for providing an improved packet structure for Mobile Display Digital Interface (MDDI) links.

2. Background

In the field of interconnect technologies, demand for ever increasing data rates, especially as related to video presentations, continues to grow.

The Mobile Display Digital Interface (MDDI) is a cost-effective, low power consumption, transfer mechanism that enables very-high-speed data transfer over a short-range communication link between a host and a client. MDDI requires a minimum of just four wires plus power for bidirectional data transfer that delivers a maximum bandwidth of up to 8 Gbits per second.

In one application, MDDI increases reliability and decreases power consumption in clamshell phones by significantly reducing the number of wires that run across a handset's hinge to interconnect the digital baseband controller with an LCD display and/or a camera. This reduction of wires also allows handset manufacturers to lower development costs by simplifying clamshell or sliding handset designs. Further, differential signaling employed with MDDI reduces electromagnetic interference that can occur over traditional parallel connections.

There are some improvements needed to the current MDDI systems. Existing systems first transmit a round trip delay measurement packet and then transmit a separate reverse encapsulation packet in order for the host to receive data from the client. Further, the existing systems provide a maximum reverse byte indicator from the client to the host in the reverse encapsulation packet. The presently claimed invention does not have this indicator and instead defines the maximum length in the packet length field, so the client can send up to the identified maximum length, and sends a "0" in the packet length field to indicate that the data transmission has been completed. The presently claimed invention is a significant improvement over the present systems by removing the redundant field transmissions.

SUMMARY

Aspects of the claimed invention, disclosed herein, address the above stated needs by providing a method, system, and computer program product that provides an enhanced reverse link encapsulation packet. The enhanced reverse link encapsulation packet combines the features of a round trip delay packet with a reverse encapsulation packet in a single packet. The first part of the reverse transmission is a preamble that allows the host to sync up to the reverse link data so that it can accurately sample the reverse data.

Further aspects, features, and advantages of the claimed present invention, as well as the structure and operation of the various aspects of the claimed present invention, are described in detail below with reference to the accompanying drawings.

DETAILED DESCRIPTION

The word "exemplary" is used herein to mean "serving as an example, instance, or illustration." Any aspects described herein as "exemplary" is not necessarily to be construed as preferred or advantageous over other aspects.

The aspects described, and references in the specification to "one aspect", "an aspect", "an example aspect", etc., indicate that the aspects described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects, whether or not explicitly described.

The Mobile Display Digital Interface (MDDI) is a cost-effective, low power consumption, transfer mechanism that enables very-high-speed serial data transfer over a short-range communication link between a host and a client. In order to fully appreciate the new features introduced herein, a brief discussion of the MDDI system is provided.

In the following, examples of MDDI will be presented with respect to a camera module contained in an upper clamshell of a mobile phone. However, it would be apparent to persons skilled in the relevant art(s) that any module having functionally equivalent features to the camera module could be readily substituted and used in aspects of this invention.

Further, according to aspects of the invention, a MDDI host may comprise one of several types of devices that can benefit from using the claimed present invention. For example, the host could be a portable computer in the form of a handheld, laptop, or similar mobile computing device. It could also be a Personal Data Assistant (PDA), a paging device, or one of many wireless telephones or modems.

Alternatively, the host could be a portable entertainment or presentation device such as a portable DVD or CD player, or a game playing device. Furthermore, the host can reside as a host device or control element in a variety of other widely used or planned commercial products for which a high speed communication link is desired with a client. For example, a host could be used to transfer data at high rates from a video recording device to a storage based client for improved response, or to a high resolution larger screen for presentations. An appliance, such as a refrigerator, that incorporates an onboard inventory or computing system and/or Bluetooth connections to other household devices, can have improved display capabilities when operating in an internet or Bluetooth connected mode, or have reduced wiring needs for in-the-door displays (a client) and keypads or scanners (client) while the electronic computer or control systems (host) reside elsewhere in the cabinet. In general, those skilled in the art will appreciate the wide variety of modern electronic devices and appliances that may benefit from the use of this interface, as well as the ability to retrofit older devices with higher data rate transport of information utilizing limited numbers of conductors available in either newly added or existing connectors or cables. At the same time, a MDDI client may comprise a variety of devices useful for presenting information to an end user, or presenting information from a user to the host. For example, a micro-display incorporated in goggles or glasses, a projection device built into a hat or helmet, a small screen or even holographic element built into a vehicle, such as in a window or windshield, or various speaker, headphone, or sound systems for presenting high quality sound or music. Other presentation devices include projectors or projection devices used to present information for meetings, or for movies and television images. Another example would be the use of touch pads or sensitive devices, voice recognition input devices, security scanners, and so forth that may be called upon to transfer a significant amount of information from a device or system user with little actual "input" other than touch or sound from the user. In addition, docking stations for computers, car kits or desk-top kits, and holders for wireless telephones may act as interface devices to end users or to other devices and equipment, and employ either clients (output or input devices such as mice) or hosts to assist in the transfer of data, especially where high speed networks are involved. However, those skilled in the art will readily recognize that the claimed present invention is not limited to these devices, there being many other devices on the market, and proposed for use, that are intended to provide end users with high quality images and sound, either in terms of storage and transport or in terms of presentation at playback. The claimed present invention is useful in increasing the data throughput between various elements or devices to accommodate the high data rates needed for realizing the desired user experience.

Figure 1:
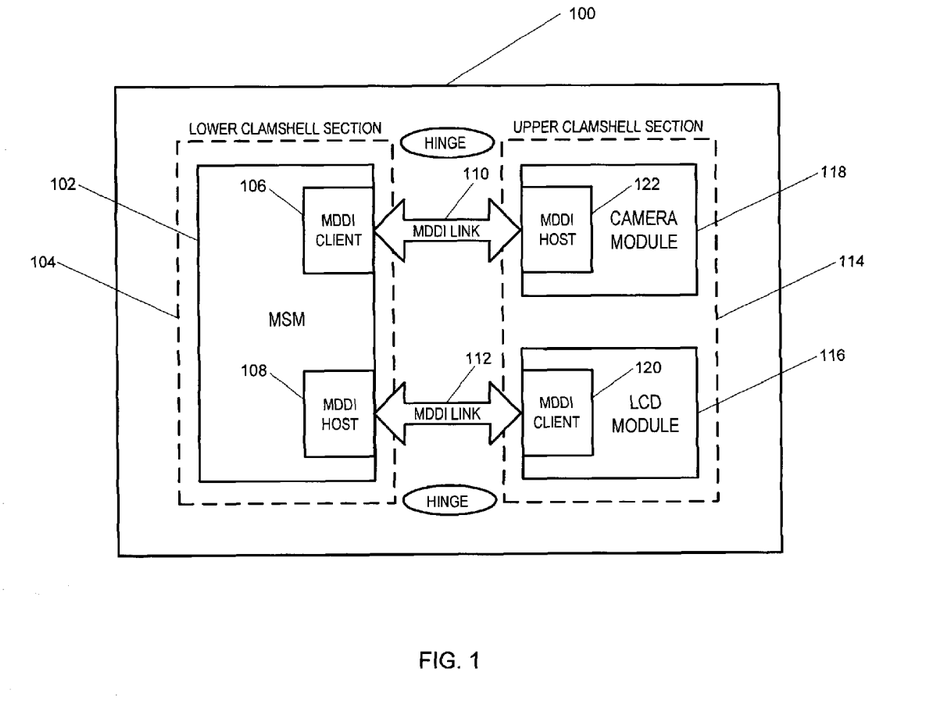
FIG. 1 is a block diagram that illustrates an example environment using a MDDI interface.

FIG. 1 is a block diagram that illustrates an example environment using a MDDI interface. In the example of FIG. 1, MDDI is used to interconnect modules across the hinge of a clamshell phone 100. It must be noted here that while certain aspects of the presently claimed invention will be described in the context of specific examples, such as MDDI interconnections in a clamshell phone, this is done for illustration purposes only and should not be used to limit the present invention to such aspects. As will be understood by a person skilled in the relevant art(s) based on the teachings herein, aspects of the presently claimed invention may be used in other devices including any that may benefit from having MDDI interconnections.

Referring to FIG. 1, a lower clamshell section 104 of clamshell phone 100 includes a mobile station modem (MSM) baseband chip 102. MSM 102 is a digital baseband controller. An upper clamshell section 114 of clamshell phone 100 includes a liquid crystal display (LCD) module 116 and a camera module 118.

Still referring to FIG. 1, a MDDI link 110 connects camera module 118 to MSM 102. Typically, a MDDI link controller is integrated into each of camera module 118 and MSM 102. In the example of FIG. 1, a MDDI host 122 is integrated into camera module 118, while a MDDI client 106 resides on the MSM side of MDDI link 110. Typically, the MDDI host is the master controller of the MDDI link. In the example of FIG. 1, pixel data from camera module 118 are received and formatted into MDDI packets by MDDI host 122 before being transmitted onto MDDI link 110. MDDI client 106 receives the MDDI packets and re-converts them into pixel data of the same format as generated by camera module 118. The pixel data are then sent to an appropriate block in MSM 102 for processing.

Still referring to FIG. 1, a MDDI link 112 connects LCD module 116 to MSM 102. In the example of FIG. 1, MDDI link 112 interconnects a MDDI host 108, integrated into MSM 102, and a MDDI client 120 integrated into LCD module 116. In the example of FIG. 1, display data generated by a graphics controller of MSM 102 are received and formatted into MDDI packets by MDDI host 108 before being transmitted onto MDDI link 112. MDDI client 120 receives the MDDI packets and re-converts them into display data for use by LCD module 116.

Frame Structure

Figure 2A:
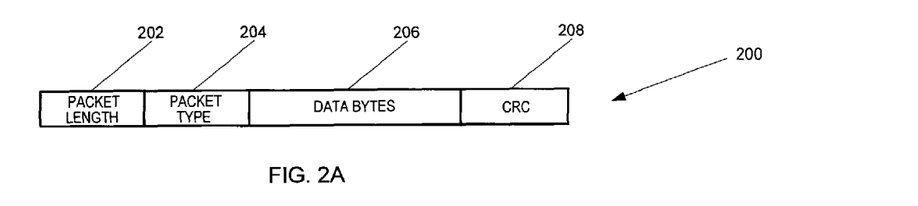
FIG. 2A shows a typical MDDI packet structure.

The original frame structure is described in U.S. Pat. No. 6,760,772 B2, entitled "Generating and Implementing a Communication Protocol and Interface for High Speed Data Transfer", issued Jul. 6, 2004, ('772 patent), and the description is hereby incorporated by reference. This original packet structure 200 is shown in FIG. 2A. The fields depicted in FIG. 2A include, packet length 202, which is typically a 16-bit value that specifies the total number of bytes in the packet, not including packet length field 202, packet type 204, which is a 16-bit unsigned integer that specifies the type of information contained in packet 200, data bytes 206, which is the data sent between the host and client, and CRC 208, which is a 16-bit cyclic redundancy check calculated over data bytes 206, packet type 204, and packet length fields 202.

Figure 2B:
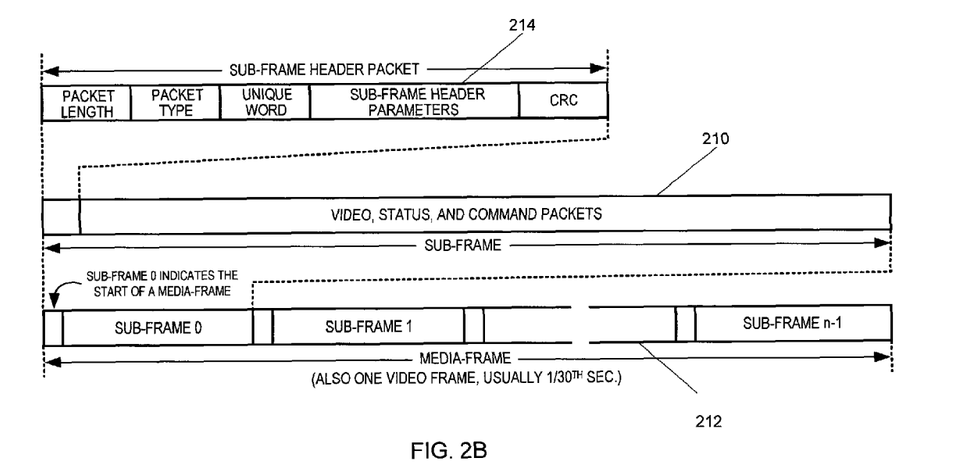
FIG. 2B depicts a typical forward link structure.

As shown in FIG. 2B, information transmitted over the MDDI link is grouped into packets. Multiple packets are grouped into a sub-frame 210, and multiple sub-frames make up a media frame 212. Every sub-frame 210 begins with a sub-frame header packet 214.

Enhanced Reverse Encapsulation Packet

Figure 3:
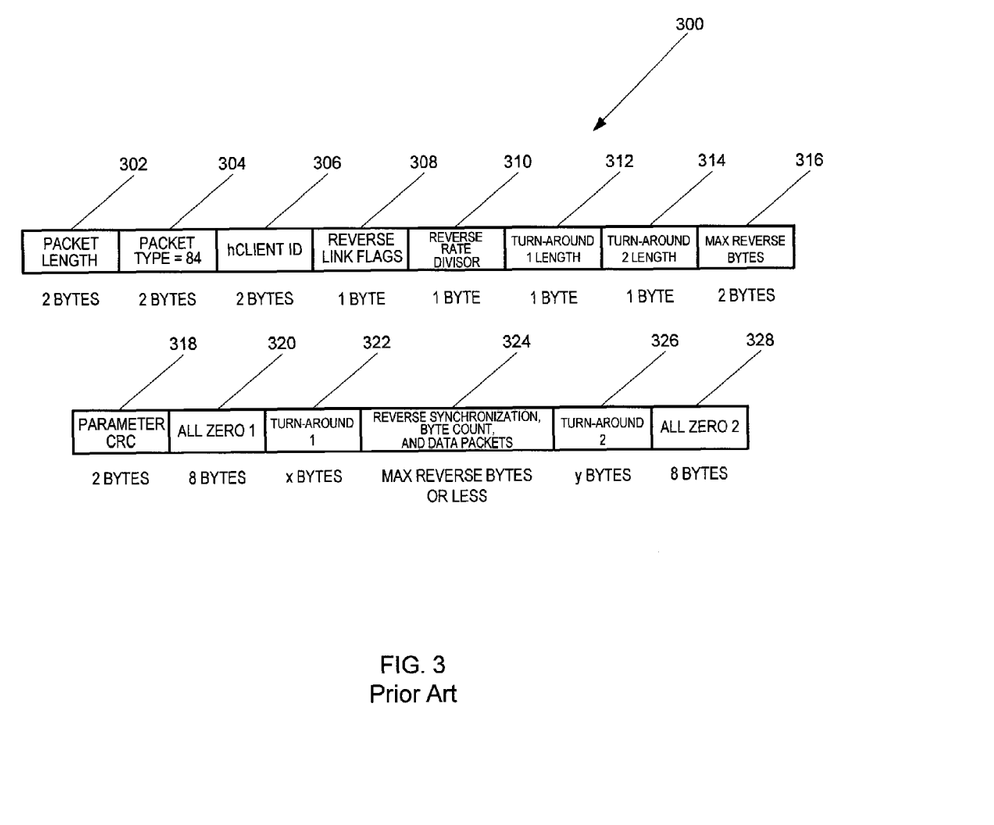
FIG. 3 shows the prior art enhanced reverse link encapsulation packet.

The previously described enhanced reverse link encapsulation packet is disclosed in co-pending patent application Ser. No. 12/116,018, and is shown in FIG. 3. This packet combines the functionality of the round trip delay measurement packet to help align the host to the incoming data stream with the reverse link encapsulation packet used to transfer data from the client to the host. This packet uses a synchronization pattern to find the alignment of the incoming byte data. Once the synchronization pattern is found in the incoming data stream, the host can reliably sample the remaining reverse link data bits to put together a reverse link data and packet stream.

This prior art enhanced reverse link encapsulation packet 300 contained a maximum reverse bytes field 316 to indicate how many reverse bytes can by transmitted from the client back to the host. The remaining numbered elements in FIG. 3 are similar (302 through 314 and 318 through 328) and function similarly to the elements described below in FIG. 4 for the new enhanced reverse link encapsulation packet (402 through 414 and 418 through 428). The max reverse bytes field 316 of FIG. 3 is removed for the presently claimed invention and the functionality of this feature is included data rate divisor 410 as described below. The detail of the maximum number of bytes that can be transmitted from the client to the host can be derived from packet length field 402 of the enhanced reverse encapsulation packet 400 as well as data rate divisor 410 that is to be used for reverse transmission.

Figure 4:
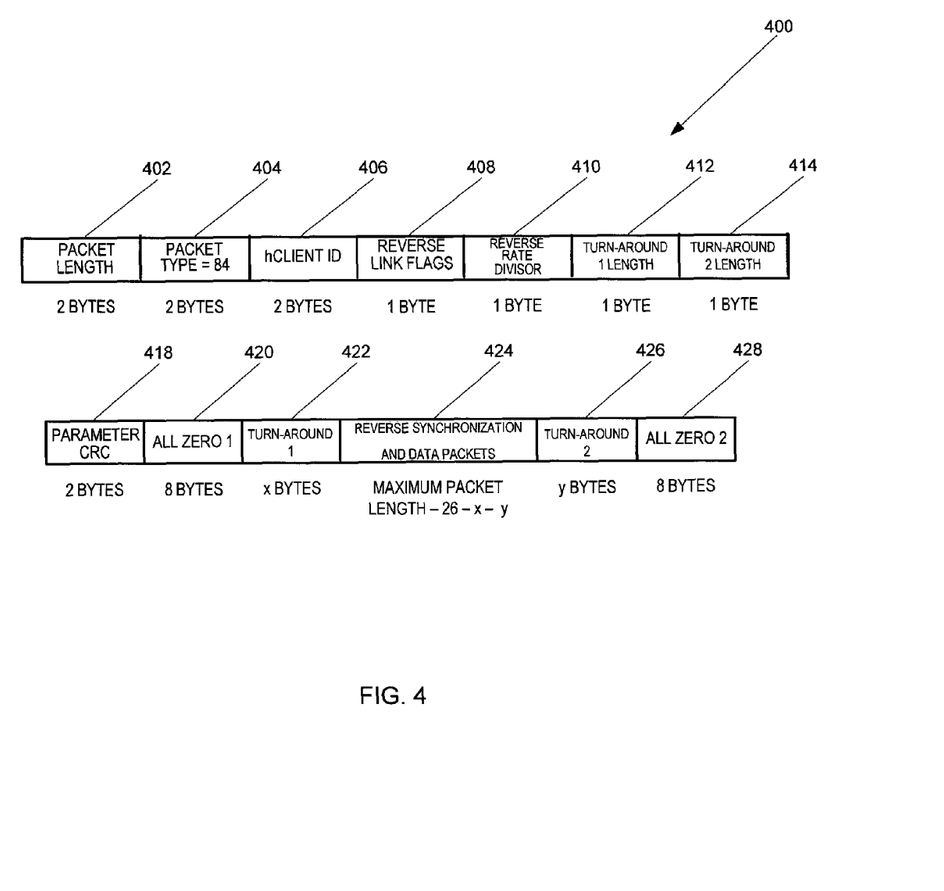
FIG. 4 shows the new enhanced reverse encapsulation packet.

The packet contents for the new enhanced reverse link encapsulation packet 400, as shown in FIG. 4, are as follows:

Packet length 402 comprises 2 bytes that contain a 16-bit unsigned integer that specifies the total number of bytes in the packet not including packet length 402 field.

Packet length field 402 defines the maximum packet length. In the presently claimed invention, the packet data length 402 sent from the host to the client must be non-zero. It is the client that can send packet lengths of zero back to the host to terminate transmission Packet type 404 comprises 2 bytes that contain a 16-bit unsigned integer. In this example, a packet type 404 of 84 identifies the packet as an enhanced reverse link encapsulation packet 400.

The next field is hClient ID 406 comprising 2 bytes that contain a 16-bit unsigned integer reserved for the client ID.

Reverse link flags 408 comprise 1 byte that contains an 8-bit unsigned integer that contains a set of flags to request information from the client and specify the reverse link interface type. In this example, if a bit is set to one, then the host requests the specified information from the client. If the bit is zero then the host does not need the information from the client. For example, Bit 0 could indicate that the host needs a client capability packet. It shall be sent by the client to the host in reverse data packets 424 field. Bit 1 could indicate that the host needs the client request and status packet. It shall be sent by the client to the host in reverse data packets 424 field. Bit 2 could indicate that the host needs the client to transmit a synchronization byte before transmitting the first data byte of a reverse link packet 424.

Reverse rate divisor 410 comprises 1 byte that contains two 4-bit unsigned integers with valid values of 0, 1, 2, 4 or 8 that specify the number of MDDI_Stb cycles that occur per reverse link data clock, except for the value of 0. The first divisor indicates the divisor to be used for the sync pattern, and the second value indicates the divisor to be used for packet data. The reverse link data clock is equal to the forward link data clock divided by the quantity: two times reverse rate divisor 410, except when the quantity in this field is 0, and in that case the reverse link clock is equal to the forward link clock. The reverse link data rate is related to the reverse link data clock, and the interface type on the reverse link in the following examples:

Interface Type 1 indicating the reverse data rate equals the reverse link data clock;

Interface Type 2 indicating the reverse data rate equals two times reverse link data clock;

Interface Type 3 indicating that the reverse data rate equals four times reverse link data clock; and Interface Type 4 indicating that the reverse data rate equals eight times reverse link data clock.

Turn-around 1 length 412 comprises 1 byte that contains an 8-bit unsigned integer that specifies the total number of bytes that are allocated for turn-around 1. The recommended length of turn-around 1 is the number of bytes required for the MDDI_Data drivers in the host to disable their outputs. This is based on the output disable time, the forward link data rate, and the forward link interface type selection being used. Turn-around 2 length 414 comprises 1 byte that contains an 8-bit unsigned integer that specifies the total number of bytes that are allocated for turn-around 2. The recommended length of turn-around 2 is the number of bytes required for the round-trip delay plus the time required for the host to enable its MDDI_Data drivers. Turn-around 2 length 414 may be also be any value larger than the minimum required value calculated to allow sufficient time to process reverse link packets in the host. Parameter CRC 418 comprises 2 bytes that contain a 16-bit CRC of all bytes from packet length 402 to turn-around 2 length 414. If this CRC fails to check, then the entire packet should be discarded. All zero 1 420 comprises 8 bytes that each contain an 8-bit unsigned integer equal to zero. This field ensures that all MDDI_Data signals are at a logic-zero level for a sufficient time to allow the client to begin recovering clock using only MDDI_Stb prior to disabling the host's line drivers during turn-around 1 422 field. Turn-around 1 422 comprises a first turn-around period. The number of bytes specified by turn-around 1 length 412 parameter is allocated to allow the MDDI_Data line drivers in the client to enable before the line drivers in the host are disabled. The client shall enable its MDDI_Data line drivers during bit 0 of turn-around 1 422 and the host shall disable its outputs and be completely disabled prior to the last bit of turn-around 1 422. The MDDI_Stb signal behaves as though MDDI_Data0 were at a logic-zero level during the entire turn-around 1 422 period.

Reverse synchronization and data packets 424 are shown as a single field in FIG. 4. The first byte in this field should be the synchronization pattern (0x053F) if requested by bit two being set to logic one in reverse link flags 408 field. This field should be followed by the packet length field of the first reverse link packet. More than one packet can be transmitted in the reverse data period if there is enough room. The client may send filler packets or drive the MDDI_Data lines to a logic-zero level when it has no data to send to the host for a period of two reverse link byte times. If the MDDI_Data lines are driven to zero for this period, the host will interpret this as a packet with a zero length (not a valid length) and both the host and the client will move from the reverse encapsulation field to the Turn-around 2 field 400 after this period. Turn-around 2 426 comprises the second turn-around period. The number of bytes is specified by the turn-around 2 length 414 parameter. The host shall enable its MDDI_Data line drivers and be completely enabled prior to the last bit of turn-around 2 426 and the client shall disable its outputs and be completely disabled prior to the last bit of turn-around 2 426. The purpose of turn-around 2 426 is to allow the remaining amount of data from reverse data packets 424 field to be transmitted from the client. Due to variations in different systems and the amount of safety margin allocated it is possible that neither the host nor client will be driving the MDDI_Data signals to a logic-zero level during some parts of the turn-around 2 426 field as seen by the line receivers at the host. The MDDI_Stb signal behaves as though MDDI_Data0 were at a logic-zero level during the entire turn-around 2 426 period. All zero 2 428 comprises 8 bytes that each contain an 8-bit unsigned integer equal to zero. This field ensures that all MDDI_Data signals are at a logic-zero level for a sufficient time to allow the client to begin recovering clock using both MDDI_Data0 and MDDI_Stb after enabling the host's line drivers following the turn-around 2 426 field.

This specification discloses one or more aspects that incorporate the features of the claimed invention. The disclosed aspects merely exemplify the claimed invention.

The scope of the claimed invention is not limited to the disclosed aspects. The invention is defined by the claims appended hereto.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles or any combination thereof.

Those of skill would further appreciate that the various illustrative logical blocks, modules, circuits, and algorithm steps described in connection with the embodiments disclosed herein may be implemented as electronic hardware, computer software or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method of providing an enhanced reverse link encapsulation packet over a transmission link that couples a client and a host within an electronic device, the method comprising the steps of:
    setting a first flag within the enhanced reverse encapsulation packet transmitted from the host to the client requesting that a synchronization pattern be transmitted from client to the host;
    transmitting two (2) divisors to the client, a first divisor for calculating a factored reverse synchronization pattern rate and a second divisor for calculating a factored reverse data rate;
    providing a period of time comprising a maximum reverse link data size within the enhanced reverse link encapsulation packet for the client's transmission to the host; wherein the maximum reverse link data size is derived from the two divisors;
    providing the synchronization pattern at the factored reverse synchronization pattern rate in a reverse data portion of the enhanced reverse link encapsulation packet transmitted by the client;
    transmitting data from the client to the host at the factored reverse data rate; and
    terminating the data transmission after exhaustion of the data from the client or reaching the maximum reverse link data size.

2. The method of claim 1 wherein the step of providing a synchronization pattern comprises a specific sequence of bytes transmitted from the client to allow the host to sync up with reverse data before actual packets are transmitted on a reverse link.

3. The method of claim 2 further comprising the step of measuring a round trip delay from the client to the host.

4. The method of claim 1 further comprising the step of not setting the flag and not sending the synchronization pattern for a next transmitted enhanced reverse link encapsulation packet and using a previous measured round trip delay.

5. The method of claim 1 wherein the step of terminating the data transmission after exhaustion comprises the step of the client sending two (2) bytes of zero (0) on the reverse link indicating the exhaustion.

6. The method of claim 5 comprising the step of the host and client advancing to a next field in the enhanced reverse link packet after the client has transmitted the two (2) bytes of zero (0).

7. The method of claim 1 wherein the first and second divisors comprise a first four (4) bits for the factored reverse synchronization pattern and a second four (4) bits for the factored reverse data rate.

8. The method of claim 1 wherein the two divisors comprise a member from the group consisting of a divisor of one (1), a divisor of two (2), a divisor of four (4), a divisor of eight (8) and a divisor of sixteen (16).

9. The method of claim 1 wherein the first divisor and the second divisor are dissimilar.

10. The method of claim 1 wherein the first divisor and the second divisor are similar.

11. A system for providing an enhanced reverse link encapsulation packet over a transmission link that couples a client and a host within an electronic device, the system comprising:
    a processor;
    means for setting a first flag by the processor within the enhanced reverse encapsulation packet transmitted from the host to the client requesting that a synchronization pattern be transmitted from client to the host;

means for transmitting two (2) divisors to the client, a first divisor for calculating a factored reverse synchronization pattern rate and a second divisor for calculating a factored reverse data rate;

means for providing a period of time comprising a maximum reverse link data size within the enhanced reverse link encapsulation packet for the client's transmission to the host, wherein the maximum reverse link data size is derived from the two divisors;

means for providing the synchronization pattern at the factored reverse synchronization pattern rate in a reverse data portion of the enhanced reverse link encapsulation packet transmitted by the client;

means for transmitting data from the client to the host at the factored reverse data rate; and means for terminating the data transmission after exhaustion of the data from the client or reaching the maximum reverse link data size.

12. The system of claim 11 wherein the means for providing a synchronization pattern comprises a specific sequence of bytes transmitted from the client to allow the host to sync up with reverse data before actual packets are transmitted on a reverse link.

13. The system of claim 12 further comprising a means for measuring a round trip delay using the synchronization pattern.

14. The system of claim 11 further comprising a means for not setting the flag and not sending the synchronization pattern for a next transmitted enhanced reverse link encapsulation packet and a means for using a previous measured round trip delay.

15. The system of claim 11 wherein means for terminating the data transmission after exhaustion comprises a means for sending two (2) bytes of zero (0) on the reverse link indicating the exhaustion by the client.

16. The system of claim 15 comprising a means for the host and client advancing to a next field in the enhanced reverse link packet after the client has transmitted the two (2) bytes of zero (0).

17. The system of claim 11 wherein the first and second divisors comprise a first four (4) bits for the factored reverse synchronization pattern and a second four (4) bits for the factored reverse data rate.

18. The system of claim 11 wherein the two (2) divisors comprise a member from the group consisting of a divisor of one (1), a divisor of two (2), a divisor of four (4), a divisor of eight (8), and a divisor of sixteen (16).

19. The system of claim 11 wherein the first divisor and the second divisor are dissimilar.

20. The system of claim 11 wherein the first divisor and the second divisor are similar.

21. A non-transitory computer readable medium comprising instructions for causing an enhanced reverse link encapsulation packet to be provided over a transmission link that couples a client and a host within an electronic device, the instructions comprising:

code that causes a first flag to be set within the enhanced reverse encapsulation packet transmitted from the host to the client requesting that a synchronization pattern be transmitted from client to the host;

code that causes two divisors to be transmitted to the client, a first divisor for calculating a factored reverse synchronization pattern rate and a second divisor for calculating a factored reverse data rate;

code that causes a period of time to be provided comprising a maximum reverse link data size within the enhanced reverse link encapsulation packet for the client's transmission to the host, wherein the maximum reverse link data size is derived from the two divisors;

code that causes the synchronization pattern to be provided at the factored reverse synchronization pattern rate in a reverse data portion of the enhanced reverse link encapsulation packet transmitted by the client;

code that causes data to be transmitted from the client to the host at the factored reverse data rate; and code that causes the data transmission to be terminated after exhaustion of the data from the client or reaching the maximum reverse link data size.

22. The non-transitory computer readable medium of claim 21 wherein code that causes the synchronization pattern to be provided comprises a specific sequence of bytes transmitted from the client to allow the host to sync up with reverse data before actual packets are transmitted on a reverse link.

23. The non-transitory computer readable medium of claim 22 further comprising code that causes a round trip delay to be measured using the synchronization pattern.

24. The non-transitory computer readable medium of claim 21 further comprising code that causes the flag not to be set and not to send the synchronization pattern for a next transmitted enhanced reverse link encapsulation packet and to use a previous measured round trip delay.

25. The non-transitory computer readable medium of claim 21 wherein code that causes the data transmission to be terminated after exhaustion comprises code that causes the client to send two (2) bytes of zero (0) on the reverse link to indicate the exhaustion.

26. The non-transitory computer readable medium of claim 25 comprising code that causes the host and client to advance to a next field in the enhanced reverse link packet after the client has transmitted the two (2) bytes of zero (0).

27. The non-transitory computer readable medium of claim 21 wherein the first and second divisors comprise a first four (4) bits for the factored reverse synchronization pattern and a second four (4) bits for the factored reverse data rate.

28. The non-transitory computer readable medium of claim 21 wherein the two (2) divisors comprise a member from the group consisting of a divisor of one (1), a divisor of two (2), a divisor of four (4), a divisor of eight (8) and a divisor of sixteen (16).

29. The non-transitory computer readable medium of claim 21 wherein the first divisor and the second divisor are dissimilar.

30. The non-transitory computer readable medium of claim 21 wherein the first divisor and the second divisor are similar.

* * * * *